United States Patent [19]

Felix

[11] Patent Number: 5,728,639
[45] Date of Patent: Mar. 17, 1998

[54] RECOVERY OF SPENT CATALYST

[75] Inventor: Vinci Martinez Felix, Kennett Square, Pa.

[73] Assignee: E. I. du Pont de Nemours and Company, Wilmington, Del.

[21] Appl. No.: 839,842

[22] Filed: Apr. 17, 1997

Related U.S. Application Data

[63] Continuation of Ser. No. 450,039, May 25, 1995, abandoned, which is a continuation of Ser. No. 166,480, Dec. 14, 1993, abandoned.

[51] Int. Cl.⁶ .............................. B01J 38/52; B01J 38/60
[52] U.S. Cl. .............................. 502/33; 502/22; 502/27
[58] Field of Search .............................. 502/22, 27, 33; 423/62, 63, 64, 65, 68

[56] References Cited

U.S. PATENT DOCUMENTS

| | | | |
|---|---|---|---|
| 2,962,372 | 11/1960 | Foos et al. | 75/121 |
| 3,065,046 | 11/1962 | Roos et al. | 23/18 |
| 3,107,976 | 10/1963 | Koerner et al. | 23/19 |
| 3,112,991 | 12/1963 | Fisher | 23/24 |
| 3,117,833 | 1/1964 | Pierret | 23/19 |
| 3,712,939 | 1/1973 | Capps et al. | 423/63 |
| 3,830,871 | 8/1974 | Mayer et al. | 260/683.68 |
| 3,972,710 | 8/1976 | Meyer | 75/101 |
| 3,976,475 | 8/1976 | Markland | 423/63 |
| 4,065,405 | 12/1977 | Hulme | 502/25 |
| 4,258,225 | 3/1981 | Feiring | 570/168 |
| 4,445,438 | 5/1984 | Theurer et al. | 104/12 |
| 4,451,438 | 5/1984 | Floeter et al. | 423/20 |
| 4,663,130 | 5/1987 | Bergman et al. | 423/63 |
| 4,673,554 | 6/1987 | Niwa et al. | 423/63 |
| 4,967,024 | 10/1990 | Gumprecht et al. | 570/168 |
| 5,209,910 | 5/1993 | Bludssus et al. | 423/63 |
| 5,437,848 | 8/1995 | Hard | 423/7 |

FOREIGN PATENT DOCUMENTS

WO 90/02823  3/1990  WIPO.

OTHER PUBLICATIONS

Edward G. Scheibel, Bench Scale Liquid Extraction Techniques, 49, 1679–1684, Oct. 1957.
A. E. Feiring, Chemistry In Hydrogen Fluoride v. Catalysts For Reaction Of HF With Halogenated Olefins, Journal of Fluorine Chemistry, 13 (1979) 7–18 no month.
European Search Report Apr. 1995.

*Primary Examiner*—Glenn Caldarola
*Assistant Examiner*—Alexander G. Ghyka

[57] ABSTRACT

A process is disclosed for converting a spent catalyst from conventional fluorination processes into a commercially useful tantalum or niobium oxide such as Ta(OH)5, Ta2O5, Nb(OH)5, or Nb2O5. The process broadly relates to dissolving the spent catalyst into water or an aqueous hydrofluoric acid solution, separating and disposing the undissolved residue, extracting the aqueous solution with a suitable solvent such as methyl isobutyl ketone (MIBK), and obtaining useful tantalum or niobium oxide products.

17 Claims, No Drawings

RECOVERY OF SPENT CATALYST

This is a continuation of application Ser. No. 08/450,039 filed May 25, 1995, now abandoned, which is a continuation of application Ser. No. 08/166,480 filed Dec. 14, 1993, now abandoned.

FIELD OF THE INVENTION

The present invention relates to the field of processing materials such as tantalum pentafluoride (TaF5), or niobium pentafluoride (NbF5) that were used as a catalyst for reacting hydrogen fluoride (HF) with halogenated alkenes or alkanes.

BACKGROUND OF THE INVENTION

A. E. Feiring, Journal of Fluorine Chemistry, 13, 7–18 (1979) discloses using $TaF_5$ as a halogen exchange catalyst for adding HF to tetra and trichloroethene and related compounds. The catalyst is also useful in fluorine-chlorine exchange reactions. The use of $TaF_5$ as a catalyst for the addition of HF to unsaturated compounds was also disclosed by U.S. Pat. No. 4,258,225 to Feiring. Optimum conditions for using tantalum pentafluoride ($TaF_5$), or niobium pentafluoride ($NbF_5$) in certain halogen exchange reactions was disclosed by U.S. Pat. No. 4,967,024 to Gumprecht (which corresponds to Canadian Patent No. 1,323,040. The disclosure of each of the above-identified references is hereby incorporated by reference.

U.S. Pat. Nos. 3,107,976, 3,117,833, 3,712,939, 3,972,710, and 4,445,438 disclose processes for recovering tantalum and niobium from ore by digesting the ore, followed by extracting to recover metallic materials. The disclosure of these Patents is also hereby incorporated by reference.

SUMMARY OF THE INVENTION

When conventional fluorination processes are operated commercially, it has been discovered that the halogen exchange catalyst eventually becomes spent or poisoned by being contaminated with impurities. For example, the catalyst can be poisoned by organic by-products, corrosion by-products released by the chemical reactor, or other sources of poison, thereby rendering the poisoned catalyst undesirable for continued employment. The corrosion by-products are typically caused by the high corrosively of the "superacid" system that is formed during the fluorination process, e.g., a system having a Hammett acidity of about −10 to about −30. Such a superacid system can cause metals which are used to fabricate a chemical reactor to release corrosion by-products that cause catalyst poisoning. The high replacement cost for the halogen exchange catalyst and the difficulty in safely disposing of poisoned tantalum compounds impose an economic burden upon the previously identified fluorination processes. The present invention solves these problems by providing an efficient method for purifying the spent catalyst, and yielding a purified material suitable for direct reuse, for example, in the fluorination processes or in production of tantalum metal, its compounds or alloys.

The previously identified references disclose numerous methods for obtaining useful tantalum compounds from various ores and slags containing tantalum. These references, however, demonstrate that such methods are tailored to accommodate impurities which are present in the source of tantalum, e.g., these references isolate metallic tantalum and tantalum products from ores containing calcium, uranium and other impurities normally found in tantalum ores. The tantalum ores concentrates are dry powders that normally contain tantalum and niobium, which is a naturally occurring co-ingredient in most tantalum ores, in the form of a complex oxide. Conventional ore processing methods remove tantalum and niobium from the ore, and separate tantalum from niobium. In comparison to ore, the starting material of the invention comprises a viscous and relatively reactive mass, which is believed to contain complex chemical compositions involving residual organic materials and metallic fluorides which include either tantalum or niobium based materials. Further, ore is processed as a particulate whereas the instant invention is operated as a liquid—liquid extraction method wherein substantially only one of the liquid phases contains tantalum or niobium compounds. In contrast to ore processes that employ concentrated acids at high temperatures, the instant invention can be effectively operated at relatively low temperatures and with water, MIBK, MIBK saturated with HF, and/or relatively dilute acidified solutions. It was, therefore, a surprising and an unexpected that the process of the invention is capable of recovering and/or producing useful compounds from a spent catalyst mixture, e.g., a mixture containing TaF5 and various organic compounds.

The present invention relates to a process for converting the spent catalyst from conventional fluorination processes into a commercially useful tantalum or niobium oxide, e.g., Ta2O5 or Nb2O5. The process broadly comprises dissolving the spent catalyst in at least one of water, an aqueous hydrofluoric acid solution, or acidified MIBK, separating the undissolved residue, extracting the aqueous solution with a suitable extracting agent such as methyl isobutyl ketone (MIBK), adding a basic material such as ammonium hydroxide to precipitate a hydrous oxide, and obtaining a useful oxide product.

DETAILED DESCRIPTION

The poisoned or spent fluorination catalyst that can be treated in accordance with the present invention comprises at least one member from the group consisting of TaF5, NbF5, among others. The catalyst being treated will normally be a member of a complex mixture or co-product containing, for example, poisoned TaF5, other metals such as Ni, Cr, Fe, Mo, among others, and organic compounds such as olefins, aldehydes, ketones, ethers, alcohols and halogenated organics. Normally, the spent catalyst will include about 3 to 10 wt. % organic materials. On an organic-free basis, the spent catalyst may comprise about 92 to 93 wt % TaF5 and, about 7 wt % metallic fluoride impurities, mainly compounds containing nickel, chromium, molybdenum, iron. Chlorides and carbon may also be present. A tantalum containing spent catalyst will typically contain less than about 0.07 wt % niobium.

The process is also effective to treat spent NbF5 catalyst from the equivalent fluorination reaction. In this aspect of the invention, the spent catalyst will typically contain about 89 to 90 wt % NbF5 and less than about 0.1 wt. % tantalum.

The invention relates to a process for converting a spent catalyst-containing mixture into a useful product that generally comprising the steps of:

dissolving the spent catalyst into a first water or an acidified solution such as aqueous hydrogen fluoride thereby forming a water-soluble material comprising, for example, H2TaF7 (commonly known as "fluorotantalic acid"), heating the first solution, for example, to a temperature of about 80 to 110 C. in order to remove volatile organic material, separating the first aqueous solution containing the water-soluble material from any undissolved residue, e.g., filtering, extracting the tantalum or niobium-bearing aqueous solution with at least one suitable extracting agent such as a methyl isobutyl ketone (MIBK), among other extracting agents known in the art, e.g., the tantalum compound is extracted into the MIBK. Normally, MIBK is the preferred extracting agent.

Extracting the tantalum or niobium compound from the extracting agent phase into a second aqueous solution, precipitating hydrous oxides of the tantalum or niobiums by adding a base to the second aqueous solution, e.g., Ta(OH)5 is precipitated by adding NH4OH; and, converting the hydrous oxides into an oxide. If desired, other products such as tantalum metal can be produced from the oxide. Normally, MIBK is the preferred extracting agent.

The first solution can be prepared by using at least one member from the group of MIBK, MIBK saturated with hydrogen fluoride, an aqueous HF solution, CH3OH, water, among others, for dissolving the spent catalyst. When MIBK containing solutions such MIBK saturated with HF are used for dissolving the spent catalyst, a separate extracting step can be obviated.

When the first aqueous solution comprises water, it is normally desirable to subsequently treat the spent catalyst with an aqueous acid solution, e.g., aqueous HF. The catalyst dissolution rate can be increased by using any suitable means or method for agitating the spent catalyst, e.g., using a mechanical mixer, contacting the catalyst with an aqueous acid under turbulent flow, among other suitable means.

In one aspect of the invention, metallic impurities that may have been co-extracted with the tantalum or niobium compounds can be removed by using a sulfuric acid scrub. Examples of metallic impurities that can be removed by using a sulfuric acid scrub comprise at least one of Fe, Ti, Ni, Cr, W, as their fluorides, among other impurities. For example, an effective amount of about 5 to 12N sulfuric acid can be added to the MIBK phase that contains extracted tantalum or niobium compounds. Typically, a volumetric ratio of about 1:5 sulfuric acid to extracting agent phase is sufficient to remove undesired metallic impurities. If desired, the solution containing extracted tantalum or niobium compounds can be repeatedly scrubbed with sulfuric acid.

In another aspect of the invention, an aqueous phase or a raffinate, which contains fluorinated metallic impurities, that is separated from the tantalum or niobium-containing MIBK phase can be treated with an effective amount of a base, e.g., ammonia, to precipitate metallic compounds. In some cases, the aqueous phase or raffinate is recycled for use in dissolving the spent catalyst.

While any suitable container can be used for transporting or housing the spent catalyst, the design may be varied by those skilled in the art to satisfy the relevant regulatory procedures and safety considerations. In some cases, it is desirable to back-fill the container with an inert gas such as nitrogen in order to enhance storage safety.

The starting material of the inventive process typically comprises a spent fluorination catalyst. After substantially removing the volatile organic impurities of the fluorination reaction from the spent catalyst, the spent catalyst, e.g., poisoned TaF5, will remain behind as a substantially anhydrous pasty mass. While any suitable process can be used for removing the organic impurities, typically such impurities are removed by heating, e.g., to a temperature of at least about 130 C. The remaining pasty mass will typically contain at least one high boiling organic impurity such as tetrachloroethylene, 2-methyl-1-pentene, ethanol, butyl acetate, methylene chloride, cyclohexane, hydrogen fluoride, e.g., unreacted HF, HCl, a relatively small amount of the desired fluorinated organic product, e.g., hydrochlorofluorocarbons (HCFCs) such as HCFC-123 or hydrofluorocarbons (HFCs) such as HFC-32, among other substances. The contents of the pasty mass can vary depending upon when the fluorination process was discontinued, the temperature that was used for removing impurities, among other parameters. Normally, this mass will contain at least about 3 wt % up to about 10 wt % of organic impurities.

A sufficient quantity of fluid materials should be retained in the pasty mass in order to permit the mass to be readily discharged from the reactor into the storage container. In some cases, an effective amount of a suitable inert solvent may be added to the mass for improving the discharge rate, e.g., about 1 to about 10 wt. % of a solvent may be added to the pasty mass. Examples of suitable solvents comprise at least one member from the group of HCFC-123, $CH_2Cl_2$, chlorofluorocarbons such as CFC-113, among others. The pasty mass may be discharged from the fluorination reactor into the container either by gravity or under pressure.

After discharging the spent acidic mass into the container, to enhance safe handling and/or storage, it is desirable to modify the mass by substantially removing HF and other relatively volatile impurities, e.g., HCFC-123 or perchloroethylene, methylene chloride, among other volatile impurities. Such removal can be achieved by equipping the container with an appropriate heating means such as steam jacket or electrical heating element. Normally, heating the container to a temperature of about 150 degrees C. is adequate for reducing the quantity of volatile organic impurities to less than about 1 wt %. Any volatile impurities being released from the heated container should be vented through a conventional scrubber.

At least a portion of the modified mass, within the container, is dissolved into a first solution comprising, for example, an effective amount of an aqueous hydrogen fluoride solution, e.g., containing about 10 to 15 wt % and usually about 12% by weight HF. While any suitable concentration of aqueous HF can be employed in this aspect of the invention, it is preferable to employ HF in at least stoichiometric amounts, i.e., to form H2TaF7. For best results, deionized water is employed for making any aqueous solutions of the invention. By "effective amount" of aqueous HF solution, it is meant that sufficient HF is present to dissolve substantially all of the tantalum or niobium values as H2TaF7 or H2NbF7, and an excess or additional amount of HF present as free HF to inhibit hydrolysis of the H2TaF7 or the NbF7 into insoluble oxyfluorides. A mechanical mixer, e.g., paddle mixer, is lowered into the vessel and an effective amount of the HF solution is added to the mass of spent catalyst thereby forming a slurry. Typically, the ratio of modified mass to 12% HF solution within the slurry is about 20 to 30 wt %. Other concentrations of HF and different ratios of HF to the tantalum or niobium-containing modified mass can also be used within the scope of this invention. Stirring is maintained for up to about 24 hours to ensure maximum dissolution of the slurred modified mass. During this dissolution step, heat can be generated that typically elevates the temperature of the slurry to about 55 to 65 C. Usually less than about 2–6 wt % of the mass remains insoluble.

In one aspect of the invention, the modified mass is dissolved by adding an effective amount of at least one of water, relatively concentrated aqueous HF solution, e.g., 40 to 70 wt % HF, MIBK, MIBK saturated with hydrogen fluoride, CH3OH, among others, to the spent catalyst thereby forming a slurry. Normally, about 1 gram of spent catalyst can be dissolved into about 50 ml of such solutions. The slurry is filtered and a filter cake is obtained that is in turn dissolved into at least one of the previously identified solutions. The filtering and dissolution steps are repeated until substantially all of the filter cake and modified mass have been dissolved. Typically, about 93 to 99% of the spent catalyst is dissolved. The filtrate that contains the dissolved tantalum or niobium compounds is collected and processed further in the manner described below in connection with the first aqueous solution. The remaining insoluble components of the mass, if any, can be discarded.

In another aspect of the invention, the modified mass is dissolved by adding an effective amount of the aqueous HF solution to the spent catalyst in a continuous manner. For example, the aqueous HF solution is continuously circulated into and out of the vessel coming the modified mass by using an intermediate storage tank to collect the dissolved tantalum or niobium values. The heat of reaction that is caused by the circulation is normally sufficient to dissolve or solubilize virtually all of the tantalum or niobium values in the modified mass.

The slurry comprising organic impurities, metallic impurities typically in the form of fluorides, and the solubilized H2TaF7 or the H2NbF7 can be transferred into a tank that contains a heating means such as submerged heat exchangers. The slurry can be heated with agitation for a period up to about 24 hours at a temperature of about 100 C. to enhance removal of traces of organic impurities via volatilization.

The solids within the slurry can be separated from the aqueous liquid by using any suitable method. An example of a suitable method comprises passing the slurry through a commercially available filter press. The solids can be collected for disposal, or processed farther by being mixed with untreated spent catalyst.

The dissolved tantalum or niobium compound, e.g., H2TaF7, in the first aqueous solution, is extracted and separated from impurities by using an extracting agent, such as methyl isobutyl ketone, commonly known as MIBK. A conventional counter-current extraction system can be employed for the extraction and separation. For example, the extraction system can use a series of so-called mixer-settler boxes because two phases are formed by the MIBK, namely, an organic phase (MIBK) containing the extracted tantalum or niobium compound, and an aqueous phase or a raffinate containing the impurities.

Prior to MIBK extraction, the first aqueous solution will typically contain about 100 to 300 g/l tantalum values as Ta2O5 in the form of H2TaF7. Extraction of the tantalum or niobium values from the first aqueous solution is normally conducted at ambient temperatures. The transfer of the tantalum or niobium values from the first aqueous solution into the MIBK is sufficiently rapid such that the contact times of the two phases is relatively short; usually less than about 1 minute. Multiple extraction stages, arranged in a counter-current flow pattern can be used to insure maximum extraction and separation of the tantalum or niobium values. While most of the tantalum or niobium values are present in the MIBK phase, the aqueous phase or raffinite may include about 3–4 wt % of the desired values. If desired, the MIBK extraction process can be employed upon the raffinate to increase the recovery of the desired values.

The recovery of the tantalum or niobium from the MIBK phase is typically accomplished by contacting, e.g., stripping, the tantalum or niobium-loaded MIBK with one or more stripping agents such as water or dilute HF in a counter-current extraction circuit by using commercially available mixer-settler equipment. The ratio of MIBK phase to the stripping agent is normally about 1 to 3 depending on Ta or Nb concentration in the MIBK phase. The counter-current extraction circuit produces a second aqueous solution that contains dissolved H2TaF7 or H2NbF7 and an MIBK phase that is essentially tantalum and niobium-free, e.g., less than about 0.05 to about 2 wt % Ta.

The dissolved H2TaF7 or H2NbF7 within the second aqueous solution can be precipitated as a hydrous oxide such as Ta(OH)5 by adding at least one basic material such as NaOH, NH4OH, among other suitable basic materials. The amount of hydrous oxide can vary widely; but for best results, the amount of salt is sufficient to cause precipitation of Ta(OH)5 or Nb(OH)5, i.e., stoichiometric, plus an excess amount of at least about 1 wt %. The precipitated Ta(OH)5 or Nb(OH)5 can be removed from the solution by using an expedient conventional filtration and separation techniques that are well known in this art. While the Ta(OH)5 or Nb(OH)5 is normally precipitated after obtaining a relatively concentrated aqueous H2TaF7 or H2NbF7 solution, the Ta(OH)5 or Nb(OH)5 can be formed at any expedient location in the dissolution and/or extraction process.

The resultant Ta(OH)5 or Nb(OH)5 can be washed, dried, and, if desired, converted into other oxides such as Ta2O5 or Nb2O5. For example, the hydrous oxides can be calcined in air by using an expedient method that is known in this art, e.g., the hydrous oxide can be calcined at a temperature ranging from about 700 C. to about 1000 C. Depending upon the calcination temperature that was employed, the resultant oxides can be comminuted or milled.

In one aspect of the invention, the oxides recovered by the processes discussed above can be used as a raw material for producing Ta or Nb metal. For example, the recovered oxide can be processed as an ore or employed in a manner well known for tantalum or niobium oxides.

While particular emphasis in the above discussion was placed upon recovering an oxide from spent TaF5 fluorination catalyst, the instant invention can be used for obtaining tantalum or niobium compounds from a wide range of starting materials.

The following examples are provided only to illustrate certain aspects of the present invention and not limit the scope of the appended claims.

EXAMPLE 1

A clean dry container was used for housing spent catalyst that was formed when manufacturing CF3CHCl2 (HCFC-123) by reacting CCl2=CCl2 with HF in the presence of a TaF5 catalyst. The reaction was performed substantially in accordance with the process disclosed in U.S. Pat. No. 4,967,024; the disclosure of which is hereby incorporated by reference.

When the container had been stored for about 1 month with a final pressure less than about 10 psig, the container was transported to a location for further processing of the spent catalyst.

Three samples of spent catalyst were taken from the container. The composition of the metallic elements within the three samples was analyzed by sodium peroxide fusion and sulfuric/hydrofluoric acid sample preparation methods that are known in the art. The samples were then analyzed by using Indirectly Coupled Plasma (ICP) analysis; the results of the analysis on an organic-free basis are shown in Table 1.

TABLE 1

Spent Catalyst Analyses

| Sample No. Analysis wt. % | 1 | 2 | 3 |
|---|---|---|---|
| Ta | 59.0 | 48.0 | 55.0 |
| Nb | 0.0055 | 0.0080 | 0.0130 |
| Sb | 0.0025 | 0.0020 | 0.0006 |
| Fe | 0.30 | 1.14 | 0.55 |
| Ni | 1.75 | 3.90 | 4.20 |
| W | 0.06 | 0.03 | 0.11 |
| Cr | 0.33 | 0.84 | 0.65 |
| Mo | 0.42 | 0.75 | 0.83 |
| As | <0.0002 | <0.0002 | <0.0002 |

In addition to the metals listed above, the samples also contained about 10-3 wt % organic impurities, i.e., aldehydic, unsaturated and saturated organic impurities.

An approximately 25 gram portion of Sample 1 was placed into a 200 mL polypropylene beaker. About one hundred mL of substantially deionized water was added to the beaker. The contents were magnetically stirred without heating. After about 5 hours a first aqueous solution, i.e., a digestion liquor, was separated from the residue by filtering. The residue was washed with deionized water, dried in air at a temperature of about 150 C., and weighed.

The above procedure was repeated using approximately 100 mL each of 50 wt % HF, MIBK and HF acidified MIBK (MIBK was saturated with HF); instead of deionized water, for dissolving the spent catalyst. Mass balance data for the dissolution step were determined by using conventional methods, and the quantity of the filtrate and residue, are given in Table 2.

TABLE 2

Tantalum Mass Balance, Dissolution Step
Dissolution Filtrate's Residue's Ta Recovery

|  | Ta content | Ta content | In Filtrate |
|---|---|---|---|
| Water | 13.99 gm | 0.01 gm | 99.9% |
| 50% HF | 14.35 gm | 0.01 gm | 99.9% |
| MIBK | 6.64 gm | 1.41 gm | 82.5% |
| HF/MIBK | 11.64 gm | 0.03 gm | 99.7% |

This Examples illustrates that over about 99.7 wt % of the spent catalyst was dissolved into water, 50% HF and the HF acidified MIBK; but relatively little dissolved in the MIBK alone. Without wishing to be bound by any theory or explanation, it is believed that the relatively poor overall recovery from the MIBK digestion is caused tantalum losses that occur when filtering the first solution.

EXAMPLE 2

Approximately five (5.0) milliliters of the first aqueous solution, i.e., containing dissolved spent catalyst, that was obtained during the production of Samples 1-3 described in Example 1 was retained for further analysis for determining efficiency of extraction. Approximately 100 ml of the liquor, which was not retained for comparison analysis, was extracted by using an extraction agent.

The acidity of the first aqueous solution was determined, and a sufficient quantity of a 70 wt % HF solution was added to the solution for ensuring a minimum free HF level of about 8.0 normality. An approximately 500 mL solution comprising MIBK was pre-conditioned by being contacted with 50 wt % aqueous HF, and about 20 mL of the MIBK into 5 separatory funnels. Then approximately 100 mL of the first aqueous solution was contacted with the conditioned MIBK solutions in each of the 5 separatory funnels thereby allowing the MIBK to extract tantalum from the first aqueous solutions. An MIBK extractant solution separates from the first aqueous solution. The (5) MIBK extractant solutions were collected and combined together for the next stage of processing.

The MIBK extractant solution was divided equally into to two (2) portions. One of the portions was acid scrubbed to remove undesired metallic impurities, i.e., Fe, Ti, Ni, Cr and W, that were co-extracted into the MIBK along with tantalum.

For the acid scrubbing, approximately 50 mL of the MIBK extractant solution was placed into a separatory funnel, and about 10 mL of 12 Normal H2SO4 was added to the funnel. Two layers were formed in the funnel, namely an MIBK solution and a layer containing sulfuric acid. After shaking the funnel, and separating the layers within the funnel by decantation, a second 10 mL of acid was added to the MIBK solution, and the process was repeated. The acid scrubbing was successful in removing Fe, Ti, Ni, Cr, and W impurities from the MIBK extractant solution.

After acid scrubbing, the MIBK extractant solution was then divided into 5 substantially equal portions of about 10 mL each, and one portion was placed into 5 separatory flasks. Thereafter, five individual aliquots, of about 25 ml, of deionized water were contacted counter-currently with the MIBK solution in the flasks for stripping a tantalum containing stream from the MIBK solution. The deionized water was warmed to about 40 C. to promote stripping. This procedure was then repeated for the MIBK extractant solution which was not acid scrubbed.

The water stripping solutions produced a second aqueous solution that were aqueous tantalum bearing solutions. The second solutions were neutralized with a solution comprising 5-25% ammonium hydroxide, that in turn caused hydrous tantalum oxide products to precipitate. The precipitate was recovered by filtration, and analyzed with X-ray fluorescence by using conventional techniques.

Tables 3 and 4 below illustrate the effectiveness of the invention as a function of the acid scrubbing method. As can be seen from Tables 3 and 4, acid scrubbing aided in the removal of undesired metallic impurities.

TABLE 3

Acid-Scrubbed Product Analyses Dissolution

| Agent | Water | HF Acid MIBK | Acid MIBK | Analysis Wt % |
|---|---|---|---|---|
| Ta2O5 | 100.00 | 100.00 | 100.00 | 100.00 |
| Nb2O5 | <0.01 | 0.03 | <0.01 | 0.01 |
| Sn | 0.01 | 0.01 | <0.01 | <0.01 |
| Sb | 0.02 | 0.01 | <0.01 | <0.01 |
| Fe2O3 | <0.01 | 0.02 | <0.01 | <0.01 |
| TiO2 | <0.01 | <0.01 | <0.01 | <0.01 |
| NiO | <0.01 | <0.01 | <0.01 | <0.01 |
| CoO | <0.01 | <0.01 | <0.01 | <0.01 |
| WO3 | <0.01 | <0.01 | 0.05 | 0.02 |

Note:
<0.01 designates below detection limit.

TABLE 4

| Non-Acid-Scrubbed Product Analyses Dissolution | | | | |
|---|---|---|---|---|
| Agent | Water | HF Acid MIBK | Acid.MIBK | Analysis % |
| Ta2O5 | 100.00 | 100.00 | 99.60 | 100.00 |
| Nb2O5 | <0.01 | 0.02 | <0.01 | 0.01 |
| Sn | 0.01 | <0.01 | <0.01 | 0.01 |
| Sb | 0.01 | <0.01 | <0.01 | <0.01 |
| Fe2O3 | 0.02 | 0.03 | 0.55 | <0.01 |
| TiO2 | <0.01 | <0.01 | <0.01 | <0.01 |
| NiO | 0.01 | 0.02 | 0.17 | 0.07 |
| CoO | <0.01 | <0.01 | 0.02 | 0.02 |
| WO3 | 0.02 | <0.01 | 0.06 | 0.01 |

Note:
<0.01 designates below detection limit.

While few aspects of the invention have been described in detail, one of ordinary skill would recognize that other embodiments and variations are encompassed by the appended claims.

The following is claimed:

1. A method for treating spent niobium or tantalum containing catalyst comprising:
dissolving the spent catalyst in water to form a first aqueous solution comprising H2TaF$_7$ or H2NbF$_7$, wherein the spent catalyst comprises a fluoride and organic impurities, and metallic impurities comprising at least one of Fe, Mo, Ni, and Cr,
separating said aqueous solution that contains niobium or tantalum compounds from any undissolved residue,
extracting the niobium or tantalum compounds from said aqueous solution with an extracting agent comprising MIBK thereby forming an extracting agent phase,
optionally scrubbing the extracting agent phase with sulfuric acid,
extracting the niobium or tantalum compound from said extracting agent phase into a second aqueous solution.

2. A method for recovering tantalum or niobium compounds from spent Nb or Ta-containing catalyst comprising the steps of:
dissolving a spent Nb or Ta-containing catalyst contaminated by Fe, Mo, Ni or Cr impurities in water or an aqueous acid to form a first aqueous solution comprising H$_2$TaF$_7$ or H$_2$NbF$_7$ wherein said contaminated catalyst comprises metallic fluorides,
separating said aqueous solution that contains niobium or tantalum compounds from any undissolved residue,
extracting the niobium or tantalum compounds from said aqueous solution with an extracting agent comprising MIBK thereby forming an extracting agent phase,
optionally scrubbing the extracting agent phase with sulfuric acid,
extracting the niobium or tantalum compound from said extracting agent phase into a second aqueous solution,
precipitating hydrous oxides from the second aqueous solution, and;
recovering niobium or tantalum oxide products.

3. A method for making tantalum oxide from spent tantalum fluoride catalyst comprising the steps of:
dissolving the spent catalyst in at least one of water and a dilute aqueous acid containing less than about 15 wt % hydrogen fluoride to form a first aqueous solution comprising H$_2$TaF$_7$ or H$_2$NbF$_7$ wherein the spent catalyst contains organic impurities, metal fluorides, and at least one of HF and HCl,
separating said aqueous solution that contains tantalum compounds from any undissolved residue,
extracting the tantalum compounds from said aqueous solution with an extracting agent comprising MIBK thereby forming an extracting agent phase,
scrubbing the extracting agent phase with sulfuric acid,
extracting tantalum compound from said scrubbed phase into a second aqueous solution,
converting the tantalum compound into a hydrous oxide,
calcining the hydrous oxide, and;
recovering tantalum oxide.

4. The method of claim 1 or 2 wherein the aqueous acid comprises aqueous hydrogen fluoride that forms a first aqueous phase comprising H2TaF7 or H2NbF7.

5. A method for making tantalum oxide or niobium oxide comprising the steps of:
contacting water or an aqueous acid with a spent catalyst comprising tantalum or niobium-containing fluoride thereby dissolving said material and forming a first aqueous solution comprising H$_2$TaF$_7$ or H$_2$NbF$_7$,
heating said first aqueous solution to a temperature less than about 110° C.,
separating said aqueous solution that contains tantalum or niobium compounds from any undissolved material,
extracting the tantalum or niobium compounds from said aqueous solution with an extracting agent comprising MIBK thereby forming an extracting agent phase,
optionally scrubbing the extracting agent phase with sulfuric acid,
extracting tantalum or niobium compounds into a second aqueous solution,
converting the extracted tantalum or niobium compound into a hydrous oxide,
recovering a hydous or an oxide.

6. The method of claim 1 or 3 wherein said recovery comprises adding a base to the second aqueous solution that causes a niobium or tantalum hydrous oxide to precipitate out of said aqueous phase.

7. The method of claim 6 wherein the added base comprises at least one of NH4OH and NaOH, and the precipitated hydrous oxide comprises Ta(OH)5 or Nb(OH)5.

8. The method of claim 1 or 3 wherein organic impurities comprise at least one member selected from the group of HCFC-123, HFC-32, perchloroethylene, and methylene chloride.

9. The method of claim 1, 2 or 3 wherein the spent catalyst or said material contains up to about 65 wt. % tantalum compounds and about 0.25 to about 1.0 wt % niobium.

10. The method of claim 1 or 2 wherein the spent catalyst or said material contains up to about 50 wt % niobium compounds and about 0.25 to about 1.0 wt % tantalum.

11. The method of claim 1, 2, 3 or 5 wherein said method is performed at ambient temperatures and pressures.

12. The method of claim 1, 2, 3 or 5 wherein the extracting agent is employed in a continuous process.

13. The method of claim 1, 2, or 3 wherein the dissolving step is a batch process comprising filtering the first aqueous solution.

14. The method of claim, 1, 2, 3 or 5 wherein said aqueous acid comprises about 10 to 70 wt % hydrogen fluoride.

15. The method of claim 1, 2, 3, or 5 wherein an aqueous acid is used to form the first aqueous solution and the acid comprises about 10 to 15 wt % hydrogen fluoride.

16. The method of claim 1, 2 or 5 wherein said oxide comprises niobium oxide.

17. The method of any one of claims 2, 3, or 5 wherein said dissolving or contacting step employs water.

* * * * *